United States Patent [19]

Reusser et al.

[11] 3,864,243
[45] Feb. 4, 1975

[54] REMOVAL OF CHEMICALLY COMBINED CHLORINE AND OTHER IMPURITIES FROM HYDROCARBONS

[75] Inventors: Robert E. Reusser; Bruce C. Benedict; Homer J. Sarrett, Jr., all of Bartlesville, Okla.

[73] Assignee: Phillips Petroleum Company, Bartlesville, Okla.

[22] Filed: Apr. 9, 1973

[21] Appl. No.: 349,182

[52] U.S. Cl............ 208/262, 208/299, 208/310, 260/652 P, 260/683.41, 260/683.42, 260/683.53, 260/683.57, 260/683.74
[51] Int. Cl............................................. C07c 7/12
[58] Field of Search................... 208/262, 299, 310; 260/652 P, 683.41, 683.42, 683.53, 683.74, 683.57

[56] References Cited
UNITED STATES PATENTS

| | | | |
|---|---|---|---|
| 2,402,817 | 6/1946 | Iverson | 260/683.74 |
| 2,535,735 | 12/1950 | Groebe et al. | 260/683.15 |
| 2,890,257 | 6/1959 | Ayers et al. | 260/676 |
| 3,043,771 | 7/1962 | Bloch | 260/683.74 |
| 3,470,264 | 9/1969 | Mayhue | 260/683.57 |
| 3,506,409 | 4/1970 | Hutson et al. | 260/683.57 |

*Primary Examiner*—Delbert E. Gantz
*Assistant Examiner*—C. E. Spresser

[57] ABSTRACT

A method is provided for treating hydrocarbons containing chemically combined chlorine by passing the hydrocarbons through high surface area, porous alumina at ambient temperature to remove the chemically combined chlorine and other impurities.

7 Claims, No Drawings

3,864,243

REMOVAL OF CHEMICALLY COMBINED CHLORINE AND OTHER IMPURITIES FROM HYDROCARBONS

BACKGROUND OF THE INVENTION

This invention relates to hydrocarbons containing chemically combined chlorine. In one of its aspects, this invention relates to the removal of chemically combined chlorine from hydrocarbons containing the same. In another of its aspects, this invention relates to adsorption techniques. In still another of its aspects, this invention relates to high surface area, porous alumina adsorbent agents. In one of its concepts, this invention relates to ambient temperature adsorption treatment of hydrocarbons containing chemically combined chlorine to remove chemically combined chlorine from the hydrocarbon.

Hydrocarbon products frequently contain small amounts of chlorine in the form of chemically combined chlorine. In the many processes for producing and treating hydrocarbon products there are many in which small amounts of chemically combined chlorine can be introduced into a hydrocarbon product. Usually, however, chemically combined chlorine becomes a part of the hydrocarbon product during the reaction in which the hydrocarbon product is produced, because metal chloride catalysts often introduce into the product chlorine which is not removable by water or caustic wash. If chemically combined chlorine is not removed from hydrocarbon products such as gasoline or other fuels, corrosion of engine parts can result and decrease of response to tetraethyl lead or other additives can occur when these hydrocarbon products are used as fuels for internal combustion engines. Similarly, chemically combined chlorine in a solvent such an an electrostatic toner solution can cause interference in the end use of the solvent. We have discovered that chemically combined chlorine along with other contaminants, particularly in relatively small amounts in relation to the total amount of hydrocarbon product, can be effectively removed from a hydrocarbon product.

It is therefore an object of this invention to provide a method for removing chemically combined chlorine from a hydrocarbon or a hydrocarbon mixture. It is also a more specific object of this invention to remove a variety of contaminants from alkylation products catalytically produced by the alkylation of an olefin with an isoparaffin.

Other aspects, concepts and the objects of this invention are apparent from the study of the disclosure and the appended claims.

SUMMARY OF THE INVENTION

According to the invention, chemically combined chlorine is removed from mixtures comprising hydrocarbons and chemically combined chlorine by contacting the mixtures with an amount of high surface area, porous alumina for a time sufficient that the chemically combined chlorine is adsorbed onto the alumina.

In one embodiment of the invention, a hydrocarbon catalytically produced by the alkylation of an olefin with an isoparaffin in the presence of a metal chloride catalyst is contacted with a dehydrated, high surface area, porous alumina for a time sufficient to adsorb chemically combined chlorine, sulfur, odor and color bodies onto the alumina.

In the method of the invention, any suitable means for contacting the alumina with the hydrocarbon containing organically combined chlorine is suitable. Presently preferred is a system of percolation in which the hydrocarbon to be treated is passed through a fixed bed of high surface area, porous alumina in an amount and at a rate that will allow the suitable high utilization of the adsorbent. In general, an impure hydrocarbon containing chemically combined chlorine will be passed through the bed of alumina at an hourly rate of about 0.1 to 5 volume of feed per volume of alumina. For reasons of economics and efficiency, this range is preferably about 0.5 to 3 volume of feed per volume of alumina.

Selection of a suitable alumina for use in carrying out the present invention is well within the skill of the art. In general, the alumina should be characterized by high adsorptive power, a high surface area, suitable hardness to resist crumbling during handling and use, and suitable size and granular form. It will be obvious that alumina in the nonporous form such as corundum is not desirable for use in the practice of this invention. At present, the preferred alumina is bauxite which is a native aluminum hydroxide, $Al_2O(OH)_4$. The alumina used may be of any suitable size which will attain the desired intimacy of contact with the hydrocarbon stream undergoing treatment with the alumina and a suitably high utilization of the alumina. Mesh sizes of about 8 to about 30 are usually satisfactory.

The alumina used in this invention should contain substantially no free water. It is therefore preferred that the alumina should be dehydrated to drive off free or adsorbed water before it is used to treat a contaminated hydrocarbon. When bauxite is used, it is satisfactory to dehydrate at a temperature between about 800°F. and about 1,200°F. for 1 to 10 hours. An economically efficient dehydration can be accomplished by heating to a temperature of between 900°F. and about 1,000°F. for 4 to 6 hours. When dehydrated, bauxite is an activated alumina having a porous highly adsorptive form.

The hydrocarbon containing chemically combined chlorine treated in accordance with this invention may be obtained from any source. Usually, the hydrocarbon will be obtained from a conversion wherein a metal chloride-containing catalyst and/or promoter is employed, especially an aluminum chloride catalyst promoted with hydrogen chloride. The problem of removing chemically combined chlorine occurs most commonly in the case of alkylation of isoparaffins with olefins — an excellent example of this being the alkylation of isobutane with a mixed olefin stream of ethylene and propylene in the presence of an aluminum chloride-containing catalyst promoted with hydrogen chloride to yield principally diisopropyl. The process of the present invention is applicable, however, to the hydrocarbons produced by other conversions, including isomerization and polymerization among other conversions that yield a hydrocarbon effluent containing chemically combined chlorine. As stated above, the hydrocarbon treated in accordance with the present invention can have acquired this chemically combined chlorine content as a result of a treatment as distinguished from a conversion.

While the chemically combined chlorine is largely organically combined chlorine, there may also be smaller amounts of inorganically combined chlorides such as metal chlorides illustrated by aluminum chloride, sodium chloride, etc., our invention effectively removes the chlorides whether they be organic or inorganic in nature.

Although some chemically combined chlorine can be removed by the process of this invention from hydrocarbons and hydrocarbon mixtures containing relatively large amounts of chemically combined chlorine, it is obvious that the most efficient use of the treatment will be for hydrocarbons containing a relatively small amount of chemically combined chlorine. We have found that when the hydrocarbon feed treated in accordance with this invention contains from about 0.001 to about 0.2 weight percent of chemically combined chlorine measured as chlorine and the process is carried out in the liquid phase by percolation through a bed of dehydrated bauxite at ambient temperature the treatment results in the removal of about 85 percent and often as high as 96 percent of the chemically combined chlorine from the impure hydrocarbon feed.

The following examples show the improved results obtained by the practice of the invention.

EXAMPLE I

A feed charge was obtained which comprised diisopropyl heavy alkylate made in a catalytic process in which a mixed olefin stream of ethylene and propylene was alkylated with isobutane in the presence of aluminum chloride as a catalyst. The total alkylate was first caustic scrubbed and then depropanized and deisobutanized. The light alkylate (B.P.<280°F.) was fractionated overhead and the diisopropyl heavy alkylate bottoms (B.P. Range of 280°F. to 625°F.) was used as the charge. The charge was a light straw colored liquid, having a strong odor. It also had a low freeze point (<−100°F.), 220 ppm of chloride and 55 ppm of sulfur.

The bauxite was an Arkansas bauxite of 16–30 mesh size. The bauxite was dehydrated by heating at 900°F. for 5 hours, then placed in a small container, blanketed by a dry inert nitrogen gas, and cooled to room temperature. The dehydrated activated bauxite was transferred to the percolation column in the presence of dry nitrogen gas. Approximately 250 ml. of the diisopropyl heavy alkylate was percolated through a bed of 82 gms. of the dehydrated bauxite in the ½ inch diameter percolation column at room temperature and atmospheric pressure, at a flow rate of about 1 volume of charge/1 volume of bauxite/hour. The percolated product was water clear, odorless, and contained 8 ppm chloride and 3 ppm sulfur, which meant that 96.4% of the chloride was removed and 94.5% of the sulfur was removed from the charge.

EXAMPLE II

The test of Example I was repeated under the same conditions. The percolated product was water clear, odorless and contained 29 ppm chloride and 2 ppm sulfur, which meant that 86.8% of the chloride was removed and 96.4% of the sulfur was removed from the charge.

It can be seen from the two examples above that the invention is operable and can be used not only to remove chemically combined chlorine from a hydrocarbon mixture but is also effective in removing sulfur, color bodies, and odor.

The process of removing organically combined chlorine from hydrocarbons which comprises treating the hydrocarbon with a mixture of alumina in a suitably active form, such as dehydrated bauxite, and quick lime at a temperature of 300° to 900°F. to decompose at least a major portion of the organically combined chlorine forming hydrogen chloride which is subsequently combined with the quick lime is described in U.S. Pat. No. 2,413,871. The following example is offered to show that percolation through hot bauxite is less effective for removing chemically combined chlorides from hydrocarbons than is percolation through bauxite at room temperature as illustrated by previous Examples I and II.

EXAMPLE III

A charge from the same batch of diisopropyl heavy alkylate as used in Example I was used in this test. The Arkansas bauxite was dehydrated by heating at 900°F. for 6 hours, then placed in a small container, blanketed by a dry inert nitrogen gas, and cooled. The dehydrated activated bauxite was transferred to the percolation column in the presence of dry nitrogen gas. The ½ inch diameter percolation column was heated by refluxing n-heptane surrounding the column. Approximately 500 ml of the charge was percolated through a bed of 76.9 gms. of dehydrated bauxite in the heated ½ inch diameter percolation column at 98°C. (208°F.) and atmospheric pressure at a flow rate of about 2 volume of charge per volume of bauxite per hour. The percolated product was water clear, odorless and contained 192 ppm of chloride which meant that only 12.7% of the chloride was removed. Thus removal of chemically combined chlorine from hydrocarbons by the adsorption technique of our invention is much more effective at room temperature than at 208°F.

Reasonable variation and modification are possible within the scope of the foregoing disclosure and the appended claims the essence of which is that chemically combined chlorine can be removed from hydrocarbons and hydrocarbon mixtures containing chemically combined chlorine by contacting at ambient temperature the contaminated hydrocarbon with a high surface area, porous alumina.

We claim:

1. A method for treating hydrocarbons containing impurities comprising chemically combined chlorine consisting essentially of organically combined chlorine to remove said organically combined chlorine, said method comprising contacting said hydrocarbons with an amount of high surface area, porous alumina for a time sufficient, at ambient temperature, to adsorb said chemically combined chlorine onto said alumina.

2. A method of claim 1 wherein said alumina has been dehydrated prior to passing said hydrocarbons therethrough.

3. A method of claim 2 wherein said hydrocarbons initially contain 0.2 weight percent or less chemically combined chlorine.

4. A method of claim 2 wherein said contacting is at an hourly rate of contact in volume of hydrocarbon feed per volume of porous alumina within the range of about 0.1 to about 5 and said contacting is percolation of said hydrocarbon through a bed of said alumina.

5. A method of claim 1 wherein said porous alumina is bauxite.

6. A method of claim 5 wherein said hydrocarbons are catalytically produced by the alkylation of an olefin with an isoparaffin in the presence of metal chloride catalyst and wherein said impurities additionally include sulfur, odor and color bodies which are adsorbed by said bauxite.

7. A method of claim 6 wherein said hydrocarbons consist principally of diisopropyl.

* * * * *